United States Patent [19]
Bernard et al.

[11] Patent Number: 4,768,130
[45] Date of Patent: Aug. 30, 1988

[54] CAPACITOR OF THE POLYMER FILM TYPE WITH STABILITY AT HIGH TEMPERATURES

[75] Inventors: Gilles Bernard, Seurre; Jean-Marc Bureau, Villebon sur Yvette; Jean-Claude Dubois, Magny-les-Hameaux; Jean-Luc Zattara, Dijon, all of France

[73] Assignee: Compagnie Europeenne de Composants Electroniques, Courbevoie, France

[21] Appl. No.: 106,255

[22] Filed: Oct. 9, 1987

[30] Foreign Application Priority Data

Oct. 10, 1986 [FR] France .................... 86 14151

[51] Int. Cl.$^4$ .......................................... H01G 3/175
[52] U.S. Cl. ................................................... 361/323
[58] Field of Search ............................. 361/323

[56] References Cited

U.S. PATENT DOCUMENTS

| | | | |
|---|---|---|---|
| 2,930,714 | 3/1960 | Netherwood | 361/323 X |
| 3,278,816 | 10/1966 | Gaenge et al. | 361/323 X |
| 3,590,347 | 6/1971 | Gotlob et al. | 361/323 X |
| 3,622,848 | 11/1971 | Hendrix et al. | 361/323 |
| 3,665,269 | 5/1972 | Wright et al. | 361/323 |
| 3,909,481 | 9/1975 | Pike | 524/424 |

*Primary Examiner*—Donald A. Griffin
*Attorney, Agent, or Firm*—Oblon, Fisher, Spivak, McClelland & Maier

[57] ABSTRACT

The invention pertains to a capacitor of a thermostable polymer film type. The polymer used is polyphenylquinoxaline or polyhydantoin. The polymer film may be obtained by casting with organic solutions. The capacitor can also be obtained with supporting films covered with metallizations coated with this thermostable polymer.

9 Claims, 5 Drawing Sheets

FIG_1
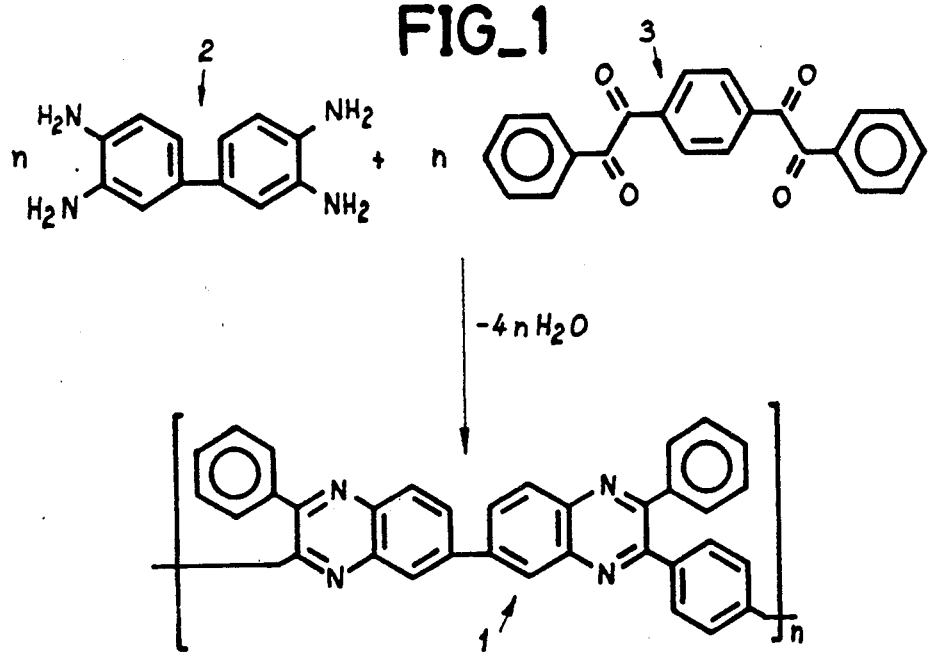
FIG_2
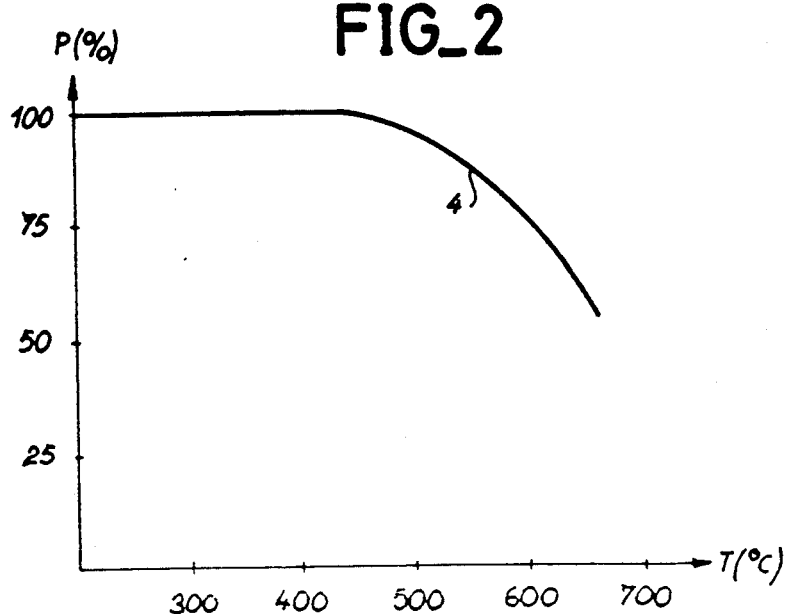

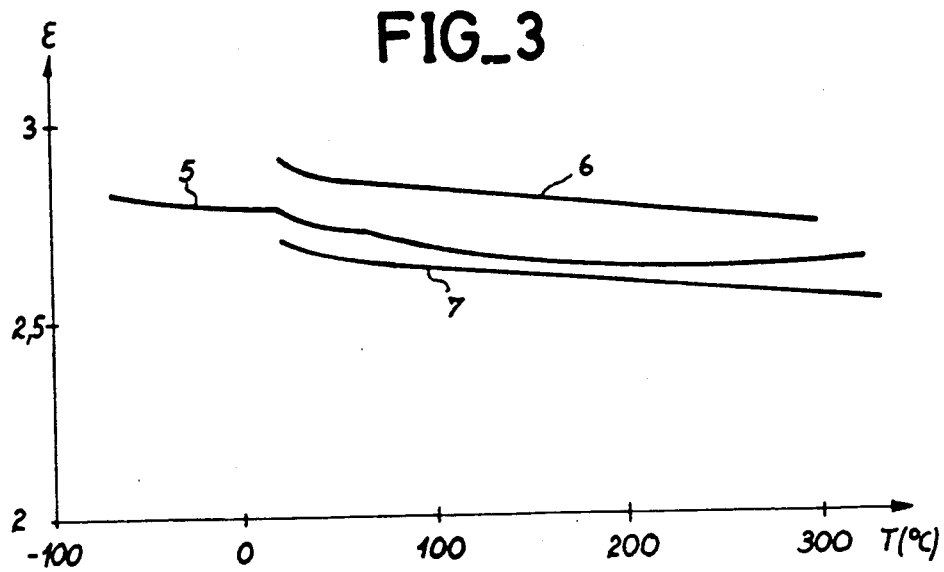
FIG_3
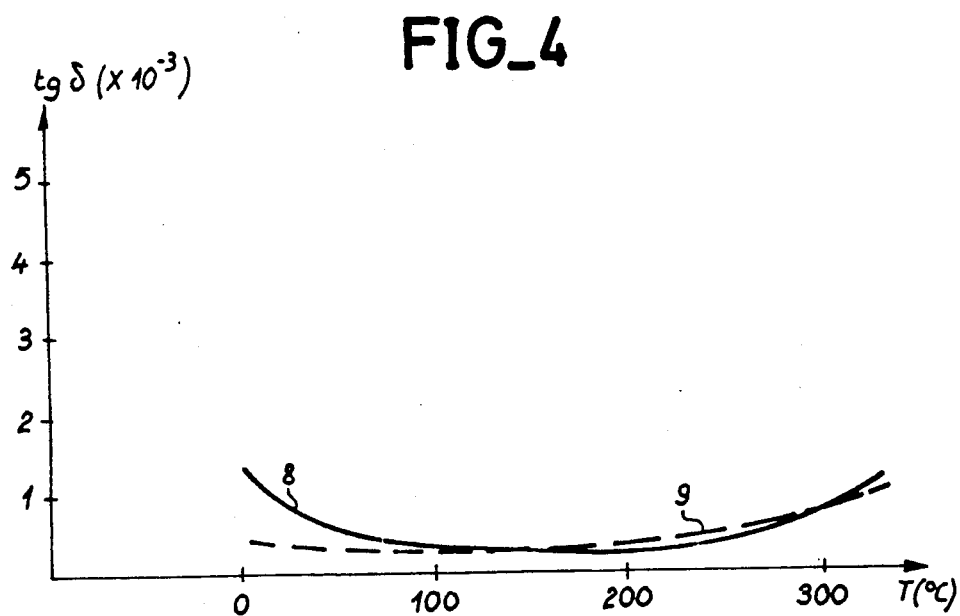
FIG_4

FIG_5
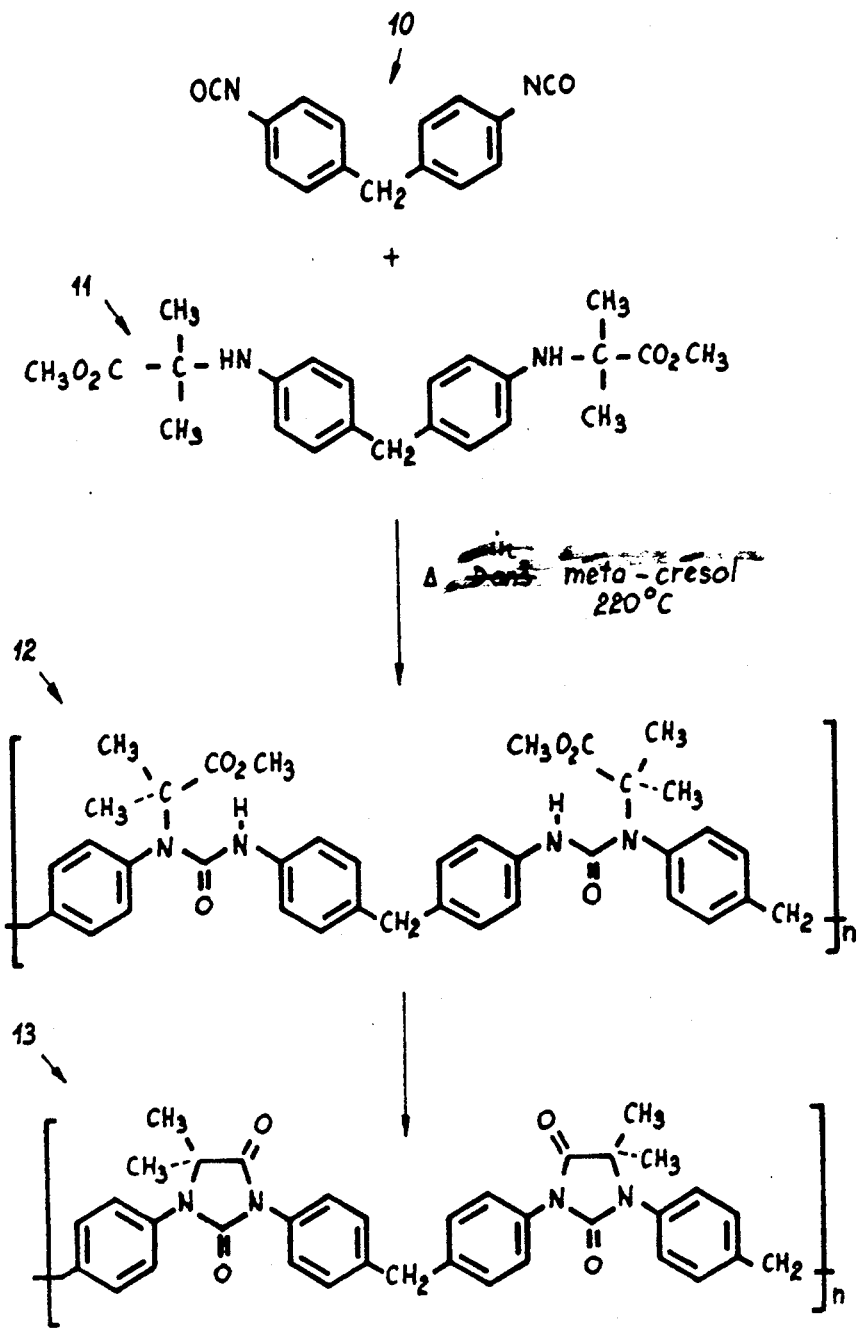

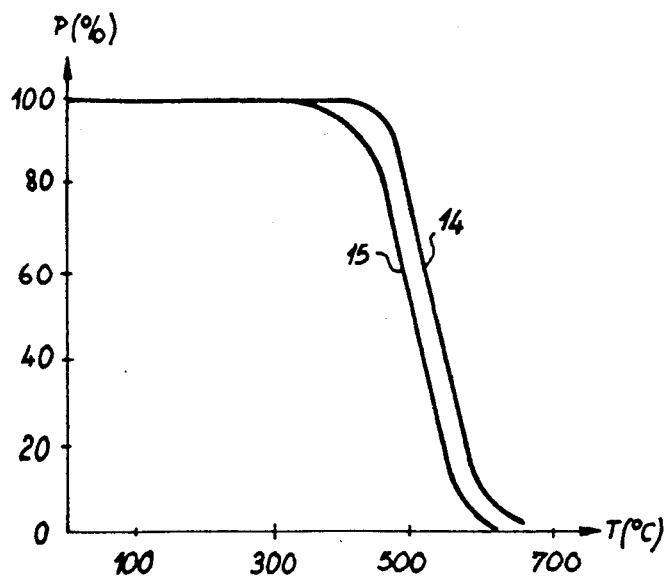
FIG_6
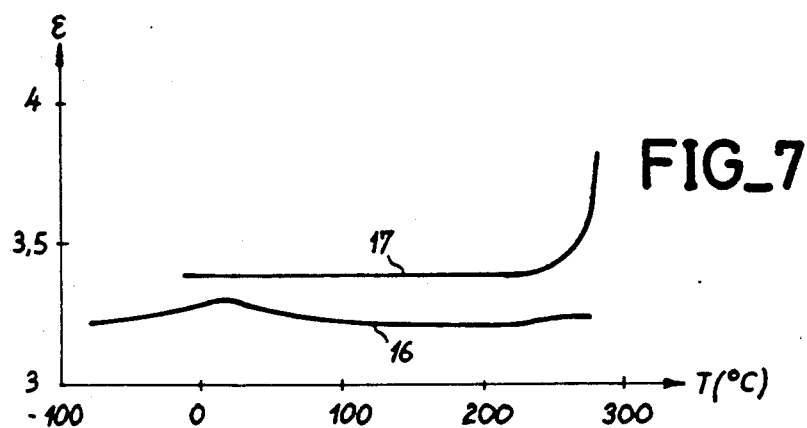
FIG_7
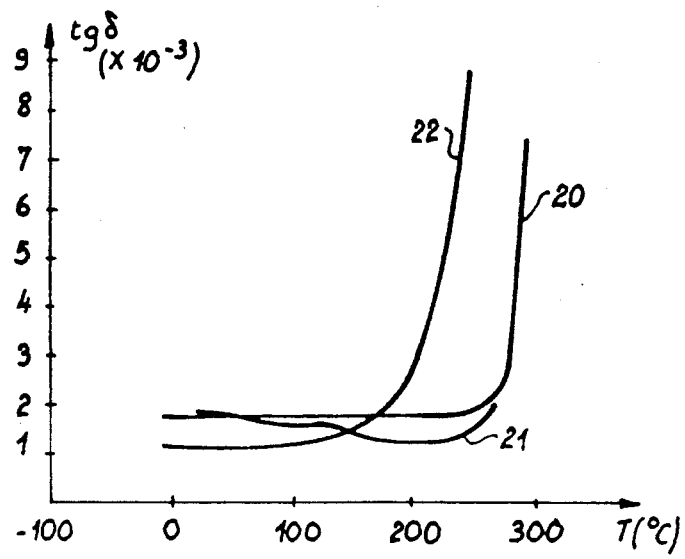
FIG_8

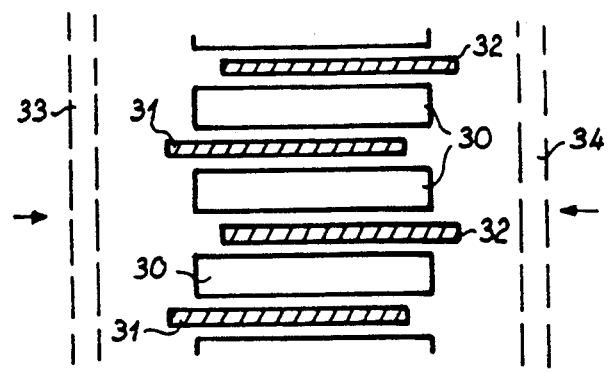
FIG_9
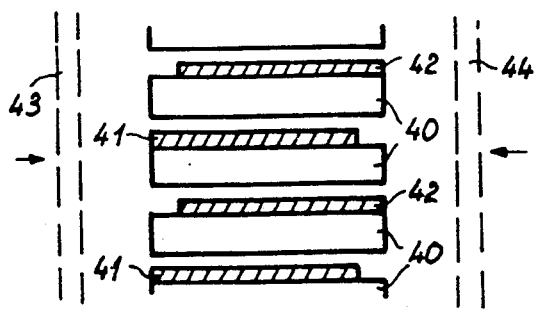
FIG_10
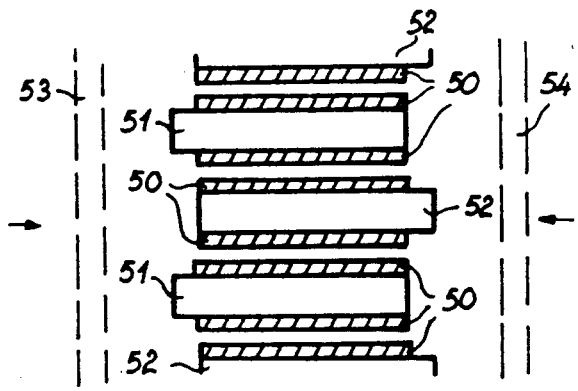
FIG_11
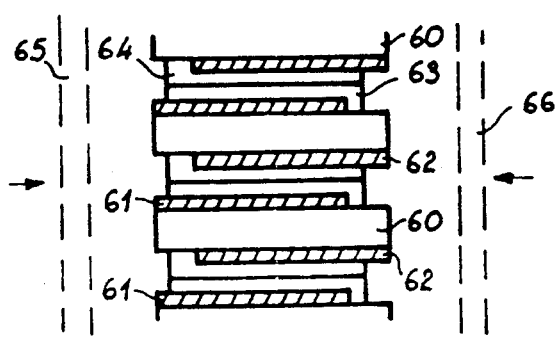
FIG_12

CAPACITOR OF THE POLYMER FILM TYPE WITH STABILITY AT HIGH TEMPERATURES

BACKGROUND OF THE INVENTION

1. Field of the Invention

The present invention pertains to capacitors of the polymer film type, with stability at high temperatures.

2. Description of the Prior Art

Prior art capacitors include capacitors based on metallized and stacked dielectric thin films. The films are made of a polymer such as polyester, polycarbonate or polypropylene. These polymers have a dielectric permittivity of about 3. It is constantly being sought to miniaturize the components and thus obtain high specific capacitances. One way of doing this is to reduce the thickness of the dielectric film as mentioned in the patent FR No. 2 548 440. According to this patent, the thin film of polymer is deposited by coating, using a solution of this polymer (the lacquer process).

Another major problem is the stability of the various characteristic parameters of a capacitor under temperature. These parameters are the value of the capacitance (namely the permittivity of the dielectric), the loss factor which must remain low and the insulation resistance which must remain high. It is difficult to find polymers possessing such qualities, all the more so as these capacitors are wanted for use at increasingly high temperatures.

To remove these disadvantages, the invention proposes to use, as a dielectric film, a polymer such as polyphenylquinoxaline or polyhydantoin. A film of this type can be obtained by casting with organic solutions or by coating (lacquering).

3. Summary of the Invention

An object of the invention, therefore, is a capacitor of the polymer film type wherein the said polymer is a polyphenylquinoxaline or a polyhydantoin.

Another object of the invention is a capacitor made up of several elementary capacitors, each elementary capacitor comprising an element of the said polymer film between a first armature and a second armature, with electrodes connecting the first armatures to each other and the second armatures to each other.

BRIEF DESCRIPTION OF THE DRAWINGS

The invention will be better understood and its other features will be seen from the following description and the appended figures, of which:

FIG. 1 shows the synthesis structure of polyphenylquinoxaline,

FIG. 2 is a graph showing the residual weight of polyphenylquinoxaline as a function of temperature, FIG. 3 is a graph showing the relative permittivity of polyphenylquinoxaline as a function of temperature, FIG. 4 is a graph showing the loss factor of polyphenylquinoxaline as a function of temperature, FIG. 5 shows the synthesis structure of polyhydantoin, FIG. 6 is a graph showing the residual weight of polyhydantoin as a function of temperature, FIG. 7 is a graph showing the relative permittivity of polyhydantoin as a function of temperature, FIG. 8 is a graph showing the loss factor of polyhydantoin as a function of temperature, FIGS. 9 to 12 are embodiments of capacitors according to the invention.

DESCRIPTION OF THE PREFERRED EMBODIMENTS

The first polymer considered is a polyphenylquinoxaline (PPQ). As will be shown further below, polyphenylquinoxaline has valuable dielectric properties, namely a good degree of permittivity, low loss factor and high insulation resistance. Furthermore, these properties are remarkably stable under temperature (up to about 350° C.). Finally, this polymer is soluble which means that it can be deposited in thin films by casting or coating methods.

FIG. 1 shows the synthesis of polyphenylquinoxaline. This polymer, the formula of which is shown under the reference 1, is prepared by the cyclization of a tetraamine 2 and a tetracetone 3. The cyclization rate is close to 100%. PPQ is soluble in the processing solvent, meta-cresol. It can be precipitated and re-dissolved in other solvents such as tetrachloro 1-1-2-2 ethane. This solubility makes it possible to have polymer solutions with a wide range of viscosities so that thin films with controlled thicknesses can be deposited. After drying, it is possible to obtain, depending on the method used, homogeneous self-supported films or films covering a support, with excellent mechanical, thermal and dielectric properties.

PPQ is an infusible thermostable polymer. It decomposes before melting.

FIG. 2 is a graph resulting from thermogravimetric analysis. The curve 4 gives the residual weight P as a function of the temperature T expressed in degrees Celsius. Its temperature of decomposition in air (defined as a temperature corresponding to the intersection of the tangents in both parts of the curve 4) is about 550° C. This decomposition is essentially a phenomenon of pyrolysis. At constant temperature, it loses 10% of its mass within 1500 hours at 300° C., and within 1000 hours at 350° C. It exhibits a vitreous transition towards 350° C. (shown by differential thermal analysis and thermomechanical analysis). Its modulus of elasticity is $8 \times 10^9 N/m^2$. Its heat expansion coefficient of $6.5 \times 10^{-5}/°C$. makes it compatible with a metal substrate.

The dielectric properties of PPQ below the vitreous transition temperature (350° C.) are remarkably stable.

FIG. 3 is a graph showing changes in the relative permittivity $\epsilon$ of PPQ as a function of the temperature T expressed in degrees Celsius. The curve 5 pertains to a film prepared with meta-cresol and tested at a frequency of 1 kHz. The curve 6 pertains to a film also prepared with meta-cresol but tested at 10 kHz. The curve 7 pertains to a film prepared with tetrachlorethane and tested at 1 kHz. It is seen, from these curves, that the permittivity varies very little between 0° and 350° C. For example, for the curve 5, the permittivity ranges between 2.6 and 2.8 when the temperature varies between $-50°$ and $+350°$ C.

FIG. 4 is a graph showing changes in the dielectric loss factor of PPQ as a function of the temperature expressed in degrees Celsius. The curve 8 pertains to a film prepared with meta-cresol and tested at 1 kHz. The curve 9 pertains to the same film tested at 10 kHz. From these curves, it is seen that the loss factor is below $10^{-3}$ between 0° and 300° C.

The volume resistivity of PPQ is very high: about $3 \times 10^{17}$ ohm $\times$ centimeters for direct voltage values ranging from 0 to 100 V.

The second polymer considered is polyhydantoin (PH). Polyhydantoin is prepared according to the synthesis diagram shown in FIG. 5. It is prepared by the polycondensation of a di-isocyanate 10 and a bis-glycinate 11 in meta-cresol at 220° C. The polyhydantoin 13 is obtained after the intermediate product 12.

PH is soluble in the processing solvent, meta-cresol. It can be precipitated and re-dissolved in other solvents such as dichloromethane. This solubility makes it possible to have polymer solutions with a wide range of viscosities so that thin films with controlled thicknesses can be deposited. After drying, it is possible to obtain, depending on the method used, homogeneous self-supported films or films covering a support, with excellent mechanical, thermal and dielectric properties.

PH is an infusible, thermostable polymer. It decomposes before melting.

FIG. 6 shows a graph resulting from thermogravimetric analysis. The curves 14 and 15 show the residual weight P as a function of the temperature T expressed in degrees Celsius. The curve 14 corresponds to a sample prepared with meta-cresol and the curve 15 to a sapmle prepared with dichloromethane. The temperature of decomposition in air is about 470° C. for the sample corresponding to the curve 14 and 430° C. for the sample corresponding to the curve 15. This decomposition is essentially a phenomenon of pyrolysis. At constant temperature, it loses 10% of its mass within 30 hours at 300° C. It exhibits a vitreous transition towards 210° C. when it is prepared with dichloromethane and towards 250° C. when it is prepared with meta-cresol (as shown by differential thermal analysis and thermomechanical analysis). Its heat expansion coefficient varies between $11 \times 10^{-5}/°C$. (preparation with meta-cresol) and $12 \times 10^{-5}/°C$. (preparation with dichloromethane) and makes it compatible with a metal substrate.

FIG. 7 is a graph showing changes in the relative permittivity $\epsilon$ of PH as a function of the temperature T expressed in degrees Celsius. The curve 16 pertains to a film prepared with metal-cresol and tested at 10 kHz in air. The curve 17 pertains to a film prepared with dichloromethane and tested at 1 kHz. The curve 16 shows a remarkable stability in permittivity, between 3.2 and 3.3, for temperatures varying between $-80°$ C. and $+280°$ C.: The curve 17 shows very high stability, at a value close to 3.4, for temperatures varying between 0° C. and 250° C. From 270° C. onwards, the permittivity increases rapidly.

FIG. 8 is a graph showing changes in the dielectric loss factor of PH as a function of the temperature expressed in degrees Celsius. The curve 20 pertains to a film prepared with meta-cresol and tested at 10 kHz in air. This curve shows that the loss factor maintains a remarkable stability, lower than $2 \times 10^{-3}$ from 0° to 260° C. Then it increases rapidly beyond this temperature. The curve 21 pertains to a film also prepared with meta-cresol and tested at 1 kHz in air. This curve shows that the loss factor stays between $10^{-3}$ and $2 \times 10^{-3}$ for temperatures varying between 0° and 270° C. The curve 22 pertains to a film prepared with dichloromethane and tested at 1 kHz in air. This curve shows that the loss factor stays below $2 \times 10^{-3}$ from 0° to 180° C., and then increases rapidly with temperature.

The volume resistivity of PH films is very high: it is about $0.45 \times 10^{17}$ ohm$\times$centimeters for direct voltage values ranging from 0 to 100 V when they are prepared with meta-cresol. The value of this resistivity is doubled when PH is prepared with dichloromethane.

These two polymers (PPQ and PH) can be advantageously used to make capacitors. The dielectric film used can be a film obtained by casting with organic solutions. These films can be free of all stresses and can be stretched longitudinally and/or transversally. Their thicknesses may vary between 1.5 and 100 microns. They can be incorporated into any technology for the making of capacitors, coiling or stacking depending on the prior art technique used. The films can be used bare or already metallized.

FIG. 9 shows an embodiment of the invention. The films 30, made of PPQ or PH, are bare and clamped between odd-numbered metallic armatures 31 and even-numbered metallic armatures 32. The stack which is thus formed receives lateral metallizations 33 and 34, which respectively connect the odd-numbered armatures 31 to one other and the even-numbered armatures 32 to one other.

FIG. 10 shows another embodiment of the invention. The films 40, made of PPQ or PH, are metallized with aluminium, zinc or copper on one of their sides. These metallizations 41 and 42 are made partially, so as to leave an alternating side margin. The metallizations 41, which end on one and the same side of the stack, are connected to one other by a side metallization 43. The metallizations 42, which end on the other side of the stack, are connected to one other by a side metallization 44.

Capacitors can be made with supporting films or armatures coated with PPQ or PH. These dielectric deposits, of a thickness varying between 0.5 and 100 microns, are obtained by conventional means of coating or lacquering such as flexographic printing, reverse-roll etc., using organic solutions. These supporting films or these armatures are then coiled or stacked according to the usual techniques.

FIG. 11 shows an embodiment of the invention. The armatures 51 and 52 (made of aluminium, tin or zinc) are coated with a layer 50 of PPQ or PH. They are stacked or coiled so as to cause a lateral offset between the even-numbered armatures 52 and the odd-numbered armatures 51. The stack thus made receives lateral metallizations 53 and 54 which respectively connect the odd-numbered armatures 51 to one another and the even-numbered armatures 52 to one another.

FIG. 12 shows another embodiment of the invention. The supporting films 60 are covered on each metallization side 61 and 62. Side margins remain alternately on each side of the supporting film 60. The metallization 61 is coated with a layer 63 of PPQ of PH. Similarly, the metallization 62 is coated with a layer 64 of the same thermostable polymer. The stack of elementary capacitors thus formed receives side metallizations 65 and 66 which respectively connect the odd-numbered metallizations 61 and the even-numbered metallizations 62 to one another. The supporting film used may itslf be a thermostable material of the PH, PPQ, polyimide or polytetrafluoroethylene type, or a non-thermostable material such as polycarbonate, polyethylene terephtlate, etc.

The operation for the thermal stabilization of the capacitors entails baking at the semi-finished or finished stage, at temperatures which depend on the materials used, and for durations ranging from 1 hour to 24 hours. For the PPQ, this temperature is about 300° C., and for the PH it is about 250° C.

What is claimed is:

1. A capacitor of the polymer film type, wherein the said polymer is a polyphenylquinolaxine or a polyhydantoin.

2. A capacitor according to the claim 1 comprising several elementary capacitors, each elementary capacitor being formed of an element of the said polymer film included between a first armature and a second armature, with electrodes connecting the first armatures to one other and the second armatures to one another.

3. A capacitor according to the claim 2 wherein the polymer film used is bare and wherein each element of the said film is clamped between first and second armatures.

4. A capacitor according to the claim 2 wherein the polymer film is metallized on one of its sides, the said metallization acting as the first and second armatures.

5. A capacitor according to the claim 2 wherein the said polymer film comprises deposits made on the first and second armatures.

6. A capacitor according to the claim 5 wherein each main side of the said armatures supports a deposit of polymer.

7. A capacitor according to the claim 2 wherein the armatures comprise metallizations deposited on a supporting film, the metallizations being themselves coated with layer of the said polymer.

8. A capacitor according to the claim 7 wherein the supporting film is also of the polyphenylquinoxaline, polyhydantoin, polyimide or polytetrafluoroethylene type.

9. A capacitor according to the claim 7 wherein the supporting film is made of polycarbonate or polyethylene terephtalate.

* * * * *